(12) United States Patent
Daems et al.

(10) Patent No.: US 7,452,071 B2
(45) Date of Patent: Nov. 18, 2008

(54) FLEXIBLE TEMPLE FOR EYEWEAR

(75) Inventors: Kurt Daems, Layton, UT (US); Brian Grigsby, Tremonton, UT (US)

(73) Assignee: Wolf Peak Holdings, LLC, Layton, UT (US)

( * ) Notice: Subject to any disclaimer, the term of this patent is extended or adjusted under 35 U.S.C. 154(b) by 0 days.

(21) Appl. No.: 11/457,729

(22) Filed: Jul. 14, 2006

(65) Prior Publication Data

US 2008/0013036 A1    Jan. 17, 2008

(51) Int. Cl.
*G02C 5/14* (2006.01)
(52) U.S. Cl. .................. 351/111; 351/62; 351/123
(58) Field of Classification Search .......... 351/123, 351/111, 114, 117, 122, 51, 86, 83, 41, 158, 351/62, 52
See application file for complete search history.

(56) References Cited

U.S. PATENT DOCUMENTS

| 4,964,714 | A | * | 10/1990 | Weymouth et al. ............ 351/62 |
| 5,631,718 | A | | 5/1997 | Markovitz et al. |
| 5,652,637 | A | | 7/1997 | Marini |
| 5,737,055 | A | | 4/1998 | Dittmeier |
| 6,886,934 | B2 | | 5/2005 | Asman et al. |
| 6,911,172 | B2 | | 6/2005 | Swab et al. |
| 6,929,365 | B2 | | 8/2005 | Swab et al. |
| 6,969,172 | B2 | | 11/2005 | Actis-Datta |
| 7,055,952 | B2 | * | 6/2006 | Fecteau et al. .............. 351/122 |

* cited by examiner

*Primary Examiner*—Hung X Dang
(74) *Attorney, Agent, or Firm*—Ryan L. Marshall; Brinks Hofer Gilson & Lione

(57) ABSTRACT

Eyewear frames having flexible temples that include a flexible lower temple portion, a rigid upper temple portion and an opening. The opening decreases in size as the flexible lower temple portion conforms to a user's head and ears.

17 Claims, 3 Drawing Sheets

FLEXIBLE TEMPLE FOR EYEWEAR

TECHNICAL FIELD OF THE INVENTION

The present invention relates generally to eyewear frames having flexible temples and more particularly to a flexible temple for eyewear which includes a flexible lower temple portion, a rigid upper temple portion, and an opening.

BACKGROUND OF THE INVENTION

Wearing eyewear for an extended period of time is often uncomfortable. One reason for this discomfort is because of the rigidity of the materials out of which eyewear is made, such as plastic, metal, or polycarbonate nylon. In addition, this rigidity decreases the ability of the eyewear to change shape in order to better fit a user's face. Improved fit and comfort are especially important in recreational or constructional activities. These activities may include a variety of sports activities such as mountain biking and construction tasks such as running a jack-hammer.

Those skilled in the art of making eyewear have sought to improve the fit and shock absorbing qualities of eyewear. One manner in which they have done so is by using a flexible rubber-like material on certain parts of the eyewear frame. The flexible rubber-like material can have moisture absorbing qualities and also improve the fit and shock absorbing abilities of the eyewear. For instance, by placing a flexible rubber-like material over portions of the temple portion of an eyewear, and in using that flexible rubber-like material as a nose pad, the eyewear is not as slippery and stays on a user's face in an improved manner. While such use has improved the fit and gripping ability of eyewear, because this flexible material is placed over the rigid skeleton of the temples, the improvements in terms of flexibility, comfort, fit, and shock absorption have been limited. For example, although flexible rubber-like material placed over the rigid temple softens the touch of the plastic or rigid temple, the underlying plastic skeleton restricts the flexible rubber-like material from forming around a user's ear. Thus, despite efforts to improve the quality and flexible nature of eyewear, improvements are still needed.

SUMMARY OF THE INVENTION

The present invention relates generally to eyewear frames having flexible temples and more particularly to a flexible temple for eyewear which includes a flexible lower temple portion, a rigid upper temple portion, and an opening or open gap temple portion. In some embodiments of the present invention, the flexible lower temple portion extends along the lower temple portion and is made out of elastomeric polymer or any other similar flexible material known to those skilled in the art. The top of the temple has a rigid upper temple portion and in between the rigid upper temple portion and the flexible lower temple portion is an opening. This opening facilitates the flexible nature of the flexible lower temple portion by allowing it to bend according to a user's head and ears in order to provide a more customized fit.

While in some embodiments the flexible lower temple portion extends along the entire lower temple, in other embodiments the flexible lower temple portion only extends for a portion of the lower temple. In addition, while in some embodiments the opening extends for a substantial portion of the temple's length, in other embodiments the opening extends for only a smaller portion of the temple's length. In other embodiments there are one or more openings. In some of these embodiments, the present invention uses one or more vertical connections to connect the rigid upper temple portion to the flexible lower temple portion, thus giving added structural support to the flexible lower temple portion.

In some embodiments of the present invention the flexible lower temple portion is substantially flat. In other embodiments, the flexible lower temple portion is not flat, having various notches or steps.

In some embodiments the rigid upper temple portion is entirely rigid and has no flexible portions. In other embodiments, the upper temple portion is partially flexible and is constructed from material similar or equivalent to the flexible lower temple portion.

In some embodiments of the present invention, a flexible material or elastomeric polymer is used without the inner skeleton of the upper temple portion. In other embodiments, a portion of flexible lower temple portion is placed over the rigid skeleton of the temple.

Some embodiments of the present invention use a co-injection manufacturing process. In this process the manufacturer uses a mold with the capability of injecting two different materials. For instance, in some embodiments a polycarbonate nylon mixture is injected and becomes the frame. The mixture is injected through one injection point while the flexible elastomeric polymer material used for the temple pieces is injected through another. In this manner, some embodiments of the present invention attach the elastomeric polymer to the temple at the front and back only, thus, creating a suspended piece of elastomeric polymer below the polycarbonate nylon frame. In other embodiments a different manufacturing process may be used to achieve similar results.

In some embodiments of the present invention, the temple is soft and flexible. In some embodiments the temple can mold around a user's ear giving the eyewear a custom fit for each individual. This is helpful to compensate for those users with ears further back or forward or for users with ears that are not level.

In addition, in some embodiments of the present invention the flexible lower temple portion absorbs much of the shock created in recreational or constructional activities while maintaining a snug fit on the user's head. For example, in some embodiments the gap above the flexible temple portion allows the eyewear to move slightly up or down without putting pressure on the ears. The tackiness of the flexible lower temple portion material helps keep the eyewear in place even with slight movement.

Some embodiments of the present invention constitute a lighter frame than other eyewear because half or substantially half of the temple is made of a flexible temple portion, which is typically a lighter material than those used in other rigid sections of an eyewear frame. The overall flexibility is also enhanced by use of the flexible lower temple portion because less rigid plastic material is used. In some embodiments of the present invention, an advantage is that the eyewear does not pinch the head as much, but instead can flex outward to provide a more comfortable fit to the user. Thus it can be seen that substantial improvements in the area of eyewear are exemplified by the present invention.

BRIEF DESCRIPTION OF THE DRAWINGS

The operation and functionality of the invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 6, is not intended to limit the scope of the invention, as claimed, but it is merely representative of the presently preferred embodiments of the invention. The presently preferred embodiments of the invention will be best understood by reference to the drawings, wherein like parts are designated by like numerals throughout.

Unless defined otherwise, technical and scientific terms used herein have the same meaning as commonly understood by one of ordinary skill in the art to which this invention belongs. Unless otherwise noted, the terms "a" or "an" are to be construed as meaning "at least one of." One skilled in the art will recognize many methods and materials similar or equivalent to those described herein, which could be used in the practice of the present invention. The present invention is in no way limited to the methods and materials described. For purposes of the present invention, the following terms are defined below.

The term "elastomeric polymer" as used herein means a material with a high degree of elasticity that can be used on eyewear to improve comfort and fit, for example, a polymeric material with a hardness less than a rigid upper temple portion. Elastomeric polymer can include, but is not limited to, styrene butadiene rubber, butyl rubber, urethane, co-polyesters, MEGOL® TPR available from Alpha Platics of Italy, or non-allergenic rubber In some instances, elastomeric polymer is a rubber material which becomes tacky, or slightly sticky when it gets moist or warm. An elastomeric polymer can be used on or for temple tips and nose pads. In some instances, elastomeric polymer comprises styrene-ethylene-butadiene-styrene.

The term "eyewear" as used herein means any frame that has one or more lenses and temples and can be worn by a user. Eyewear can include eyeglasses, sunglasses, goggles, or other objects worn over the eyes.

The term "temple" as used herein means the portion(s) of an eyewear that extends rearwardly from opposite sides of the eyewear front.

Figure 1:
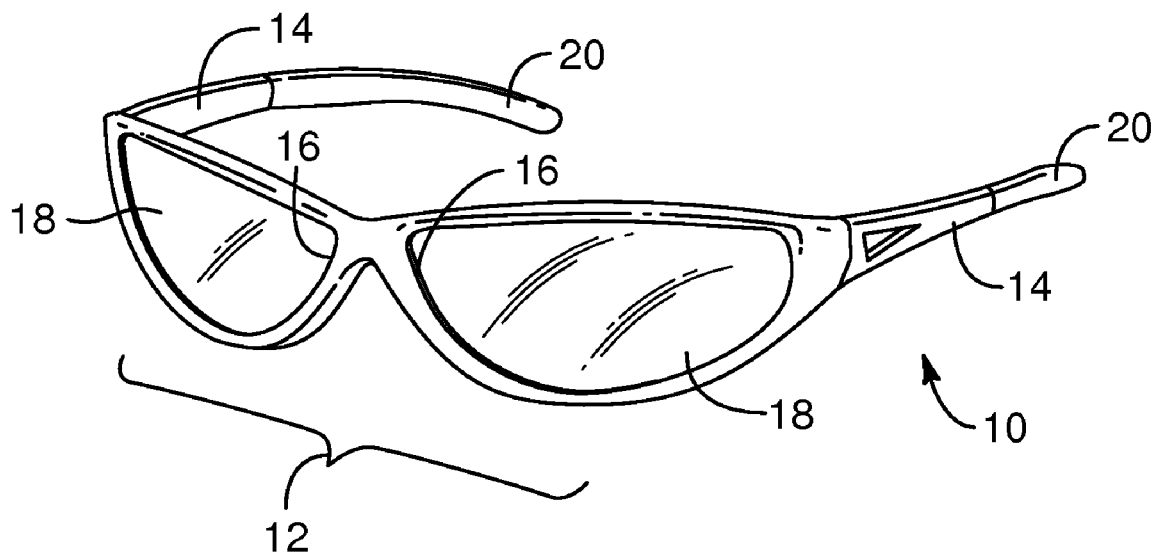
FIG. 1 is a perspective view of the prior art with elastomeric polymer temple pads.

Referring now to FIG. 1, eyewear 10 is an example of the prior art. In this example of the prior art, eyewear 10 includes an eyewear front 12 and two temples 14 extending rearwardly from the respective sides of the eyewear front 12. As can be seen from this example, eyewear front 12 includes a pair of slots 16 for receiving lenses 18. Also included in this prior art example are hydrophilic elastomeric polymer temple pads 20. These elastomeric polymer temple pads 20 cover temples 14. In other words, underlying the elastomeric polymer temple pads 20, is an underlying skeleton of temples 14. The temples 14 are typically manufactured from materials such as polymer, polycarbonate, or nylon. In any event, the temples 14 are made of a firm material making the temples 14 hard and stiff. While covering the temples 14 with the elastomeric polymer temple pads 20 lessens the stiffness of temples 14, this hard frame reduces the flexibility of the softer compound out of which the elastomeric polymer temple pads 20 are constructed. The plastic skeleton of temples 14 restricts the elastomeric polymer temple pads 20 from forming around the user's ear 22 (not shown). The rigidity of temples 14 even when covered by elastomeric polymer temple pads 20 limits the shock absorbing ability of eyewear 10. This shock absorbing quality is desirable in recreational activities such as mountain biking or construction duties such as running a jack-hammer.

Figure 2:
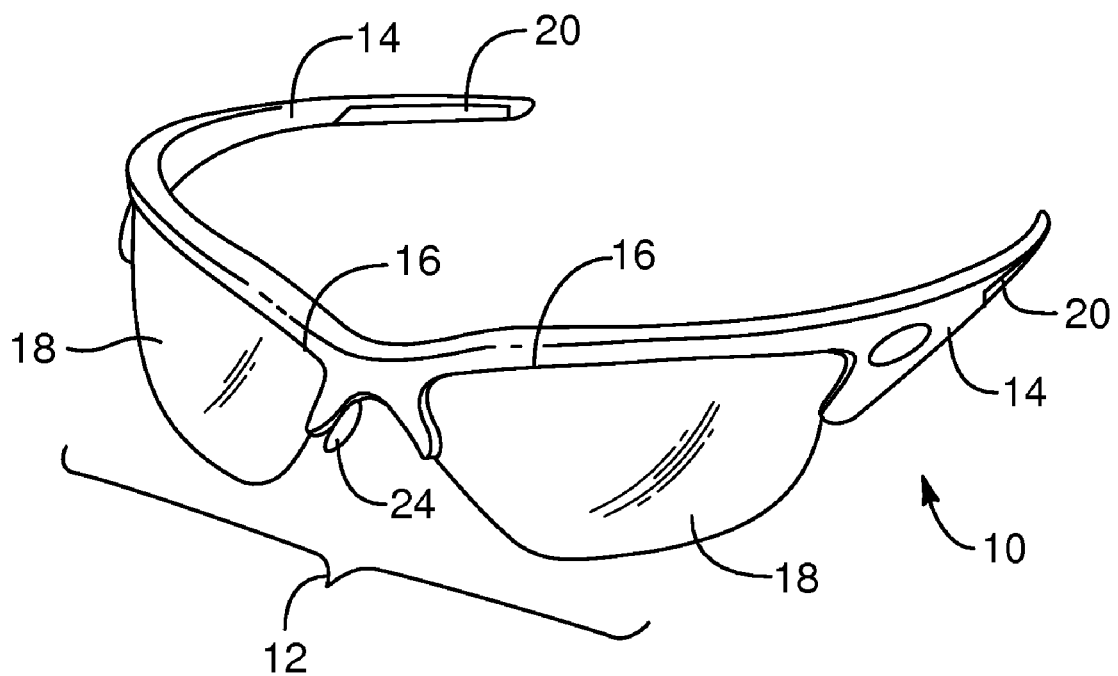
FIG. 2 is a perspective view of the prior art with elastomeric polymer nose pads and temple pads.

Referring now to FIG. 2, which is another example of the prior art, FIG. 2 shows a similar example of eyewear 10 which also includes eyewear front 12, temples 14, a pair of slots 16, lenses 18 and elastomeric polymer temple pads 20. FIG. 2 also includes hydrophilic elastomeric polymer nose pads 24.

Figure 3:
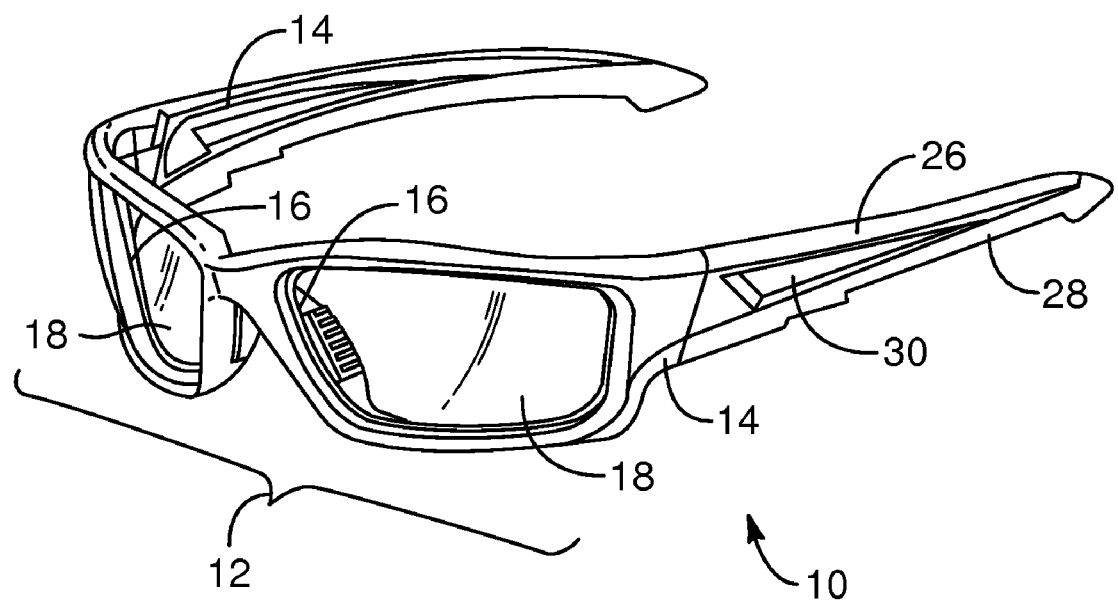
FIG. 3 is a perspective view of one embodiment of the present invention.

The embodiment shown now in FIG. 3 depicts a perspective view of the present invention. In this embodiment, eyewear 10 includes eyewear front 12 and temples 14. In this embodiment, eyewear front 12 also includes a pair of slots 16 and lenses 18. In this embodiment, temples 14 include a rigid upper temple portion 26, a flexible lower temple portion 28, and an opening 30. The lack of a rigid skeleton in the flexible lower temple portion 28 makes it very soft and flexible. The opening 30 leaves an open space for the flexible lower temple portion 28 to flex up or down depending on the need for space.

As is shown in this embodiment, temples 14 are soft and flexible. Temples 14 shown in this embodiment can mold around user's ear 22 (not shown), giving eyewear 10 a custom fit for each user 32 (not shown). This allows the present invention as is shown in this embodiment to compensate for those with ears placed further back or forward or in different vertical locations on one's head. This embodiment also absorbs much of the shock created in recreational activities, such as mountain biking, or in construction duties such as running a jackhammer, while keeping eyewear 10 in place. In addition, opening 30, which is located above flexible lower temple portion 28, allows eyewear 10 to move slightly up or down without putting an uncomfortable amount of pressure on user's ears 22 (not shown). The tacky quality of flexible lower temple portion 28 helps to stabilize and keep eyewear 10 in place even with slight movement of eyewear 10. Because half of temples 14 in this embodiment are made of flexible lower temple portion 28, which is a more lightweight material than the rigid frame of the prior art, eyewear 10 is now lighter, thus reducing pressure on user's ear 22 (not shown).

The use of flexible lower temple portion 28 also makes temples 14 more flexible because less of the rigid material is used. Use of the flexible lower temple portion 28 also helps so that eyewear 10 does not pinch user's head 34 (not shown) as much and can flex outward to provide a more comfortable fit. As defined above, the material used as flexible lower temple portion 28 can be elastomeric polymer or any other material with a degree of elasticity that improves comfort and fit.

Figure 4:
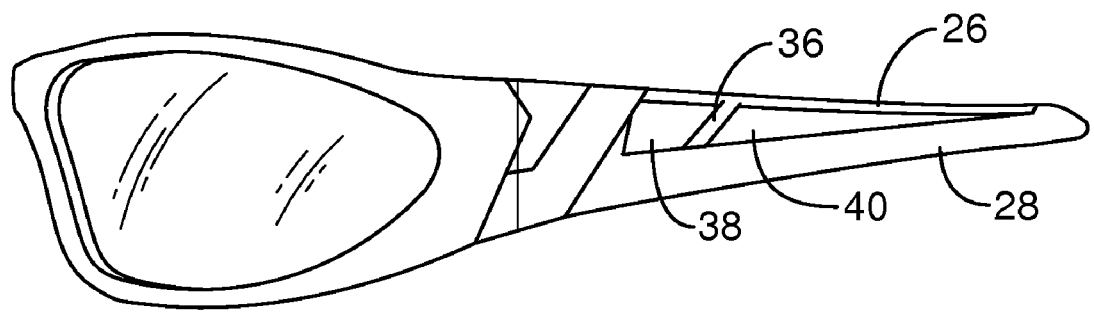
FIG. 4 is a side view of another embodiment of the present invention.

Moving now to FIG. 4, FIG. 4 shows a side view of one embodiment of the present invention. In this embodiment of the present invention, a vertical connection 36 extends from rigid upper temple portion 26 to flexible lower temple portion 28. In this embodiment, the vertical connection 36 divides opening 30 into two sections, a first opening 38 and a second opening 40. As one skilled in the art will recognize, it may be advantageous in some embodiments of the present invention to add additional vertical connections 36 to add stability to eyewear 10, for stylistic purposes or for other reasons. In addition, the present invention considers using various lengths of flexible lower temple portion 28, some of which extend along the entire length of temples 14 and some of which extend less than the entire length of temples 14.

In addition, in some embodiments of the present invention flexible lower temple portion 28 is relatively flat. FIG. 4 shows one example of a flat flexible lower temple portion 28. FIG. 3, on the other hand, shows an example of flexible lower temple portion 28 that is not flat, but includes several ridges.

Some embodiments of the present invention include a method for providing custom fitting eyewear, where the eyewear forms to the user's face and head as the flexible lower temple portion changes shape to provide a customized fit.

Some embodiments of the present invention are manufactured according to the following process which uses co-injection. In this process, the manufacturer uses a mold with the capability of injecting two different materials. For example, a polycarbonate nylon mixture may be used for the frame and is injected through one injection point. The manufacturer then injects the elastomeric polymer for the temple pieces 14 through another injection point. In this manner the manufacturer is able to attach the elastomeric polymer to the temple 14 at the front and back only thus, creating a suspended piece of flexible lower temple portion 28 below the rigid upper temple portion 26.

Figure 5:
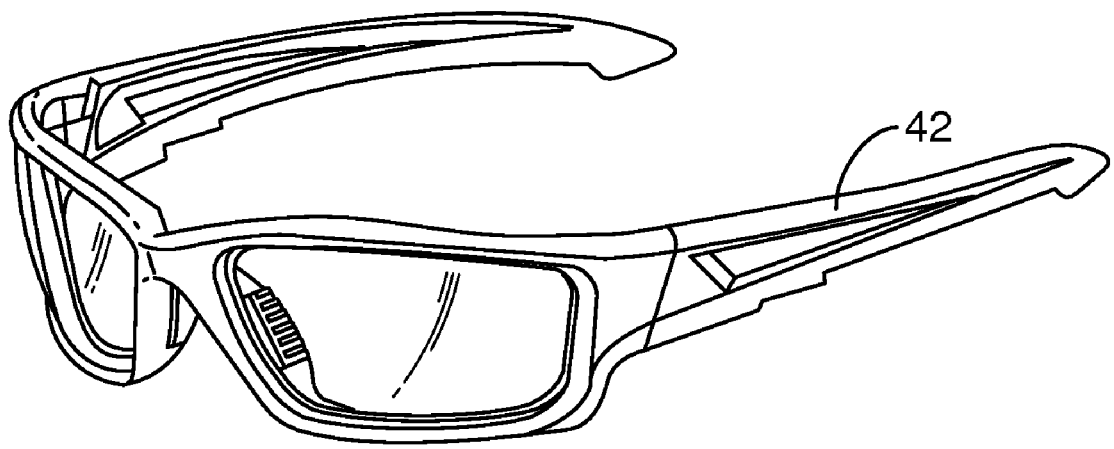
FIG. 5 is a perspective view of another embodiment of the present invention.
Figure 6:
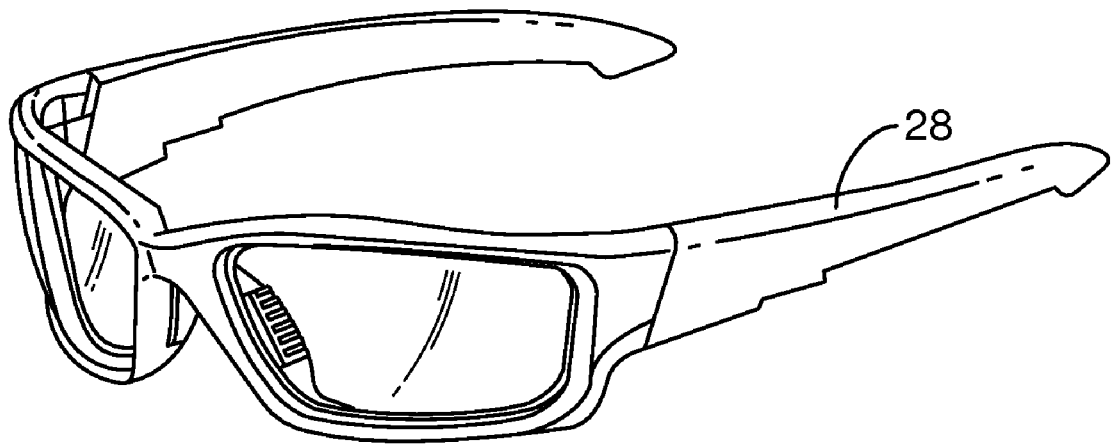
FIG. 6 is yet another perspective view of another embodiment of the present invention.

In some embodiments, as is shown in FIG. 5, the rigid upper temple portion 26 is a flexible upper temple portion 42. In other embodiments, there is no rigid upper temple portion 26 or opening 30. Instead, the temple comprises the flexible lower temple portion 28. An example of this embodiment is shown in FIG. 6.

In some embodiments, the flexible temple portion may be made from a softer material than the rigid temple portion. For example, the flexible temple portion may be made from a resilient material such as an elastomeric material, e.g., styrene butadiene rubber, butyl rubber, urethane, co-polyesters, MEGOL® TPR available from Alpha Platics of Italy, or non-allergenic rubber. The elastomeric polymer may be an silicone elastomer or a hydrocarbon elastomer. Furthermore, the elastomeric polymer may be an organic polymer. It is possible that the two temple portions may be made from the same material with different hardness values, for example a hard urethane for the rigid temple portion and a soft urethane for the flexible temple portion. The hardness of a rigid or flexible material, e.g., an elastomeric material can be measured by a Shore® durometer test, a Rockwell hardness test, or using the ASTM test designation D2240 00, among others. The hardness range of the rigid and flexible portions can vary significantly relative to each other except that the flexible temple portion must have a hardness value less than the rigid temple portion. In some embodiments, the flexible temple portion can have a hardness value of about 5 to about 100 durometer rating on the A scale. In some embodiments, the flexible temple portion can have a hardness of about 15 to about 90 durometer rating on the A scale.

The flexible temple portion may be attached to the eyewear during manufacture by use of one or more supporting members, such as hooks, protruding from rigid temple portion. In such a case, the flexible temple portion is injected into a mold or form where a rigid temple portion has already been cast or injected. The flexible temple portion solidifies or forms on and around the hook giving the flexible temple portion connective support to the rigid temple portion.

Those of ordinary skill in the art will, of course, appreciate that various modifications to the details illustrated in the schematic diagrams of FIGS. 1 through 6 may easily be made without departing from the essential characteristics of the invention. Thus, the foregoing description is intended only as an example, and simply illustrates several presently preferred embodiments consistent with the invention as claimed herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

We claim:

1. Eyewear comprising:
   an eyewear front defining a pair of slots for receiving lenses;
   a pair of temples, each temple extending rearwardly from the respective sides of the eyewear front, wherein each temple comprises:
   a rigid upper temple portion;
   a flexible lower temple portion; and
   an opening located between the rigid upper temple portion and the flexible lower temple portion, wherein at least some portion of the opening is above a user's ear when the eyewear is worn and decreases in size when the flexible lower temple portion conforms to a user's ear.

2. The eyewear of claim 1, wherein the flexible lower temple portion is made of a polymeric material with a hardness less than the rigid upper temple portion.

3. The eyewear of claim 1, wherein the flexible lower temple portion comprises an entire lower portion of the temple.

4. The eyewear of claim 1, wherein the flexible lower temple portion extends past the rigid upper temple portion.

5. The eyewear of claim 1, wherein the opening spans the length of the rigid upper temple portion.

6. The eyewear of claim 1, also comprising at least one bridging connection between the rigid upper temple portion and the flexible lower temple portion and at least two openings between the upper and lower temple portions.

7. A temple for eyewear comprising:
   a rigid upper temple portion;
   a flexible lower temple portion; and
   an opening located between the rigid upper temple portion and the flexible lower temple portion, wherein at least some portion of the opening is above a user's ear when the temple is worn and decreases in size when the flexible lower temple conforms to a user's ear.

8. The temple of claim 7, wherein the flexible lower temple portion is made of polymeric material with a hardness less than the rigid upper temple portion.

9. The temple of claim 7, wherein the flexible lower temple portion comprises an entire lower portion of the temple.

10. The temple of claim 7, wherein the flexible lower temple portion extends past the rigid upper temple portion.

11. The temple of claim 7, wherein the opening spans the entire length of the rigid upper temple portion.

12. The temple of claim 7, further comprising at least one bridging connection between the rigid upper temple portion and the flexible lower temple portion and at least two openings between the upper and lower temple portions.

13. A method for manufacturing eyewear comprising:
providing an eyewear front defining a pair of slots for receiving lenses;
providing a pair of temples, each temple extending rearwardly from the respective sides of the eyewear front, wherein each temple comprises:
a rigid upper temple portion;
a flexible lower temple portion; and
an opening located between the rigid upper temple portion and the flexible lower temple portion, wherein at least some portion of the opening is above a user's ear when the eyewear is worn and which contracts as the flexible lower temple conforms to a user's ear.

14. The method of claim 13, further comprising:
using polymeric material with a hardness less than the rigid upper temple portion to make the flexible lower temple portion.

15. The method of claim 13, wherein the temple also comprises at least one bridging connection between the rigid upper temple portion and the flexible lower temple portion and at least two openings between the upper and lower temple portions.

16. A method for providing custom fitting eyewear comprising:
providing eyewear comprising a front defining a pair of slots for receiving lenses;
providing a pair of temples, each temple extending rearwardly from the respective sides of the eyewear front, wherein each temple changes shape to form to a user in order to provide a custom fit and comprises:
a rigid upper temple portion;
a flexible lower temple portion; and
an opening located between the rigid upper temple portion and the flexible lower temple portion, wherein at least some portion of the opening is above a user's ear when the eyewear is worn and which contracts as the flexible lower temple conforms to a user's ear.

17. The method of claim 16, wherein the temple also comprises at least one bridging connection between the rigid upper temple portion and the flexible lower temple portion and at least two openings between the upper and lower temple portions.

\* \* \* \* \*